Inventors
ERNEST CARLSON &
KENNETH C. DETTMER

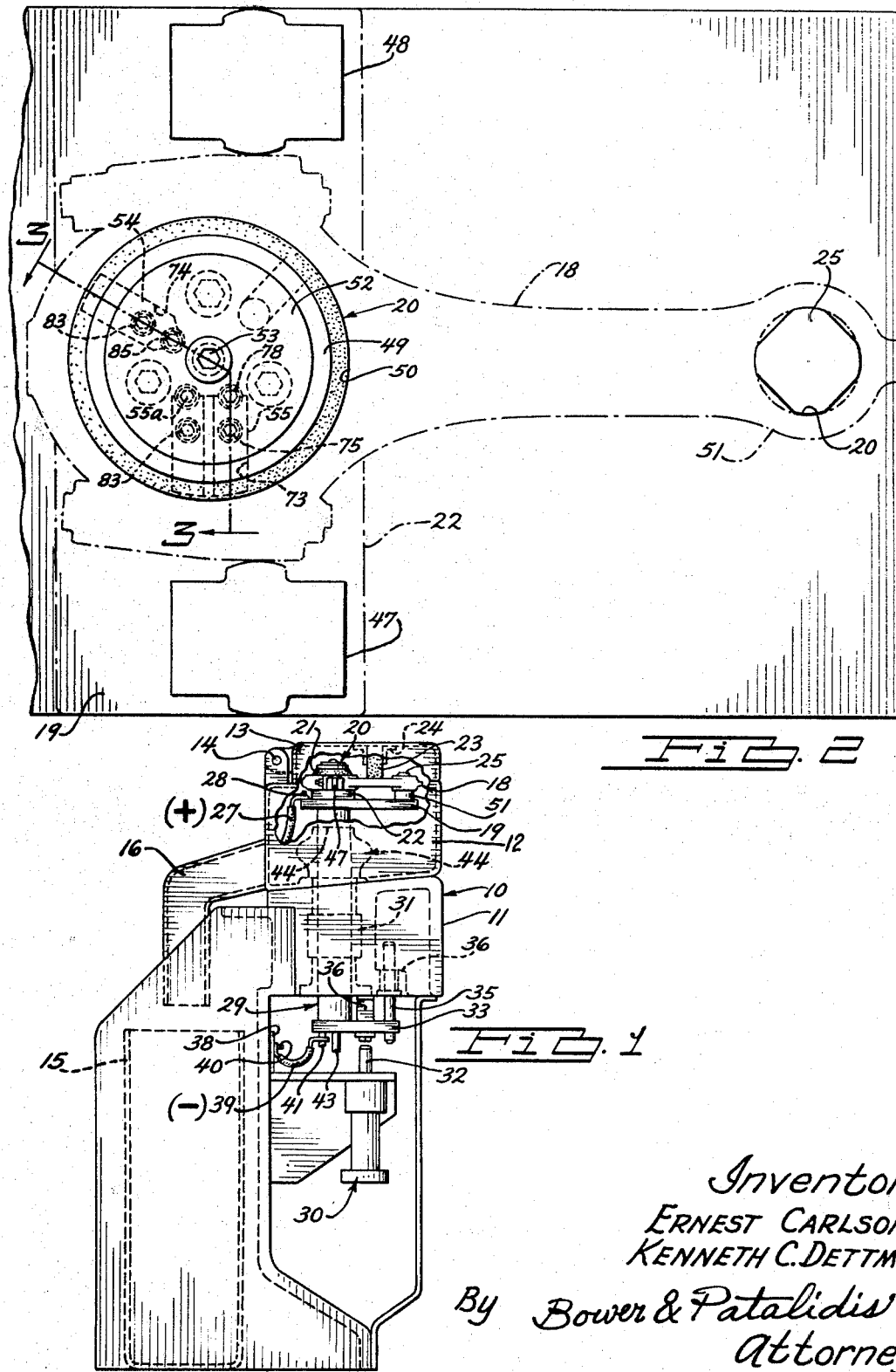

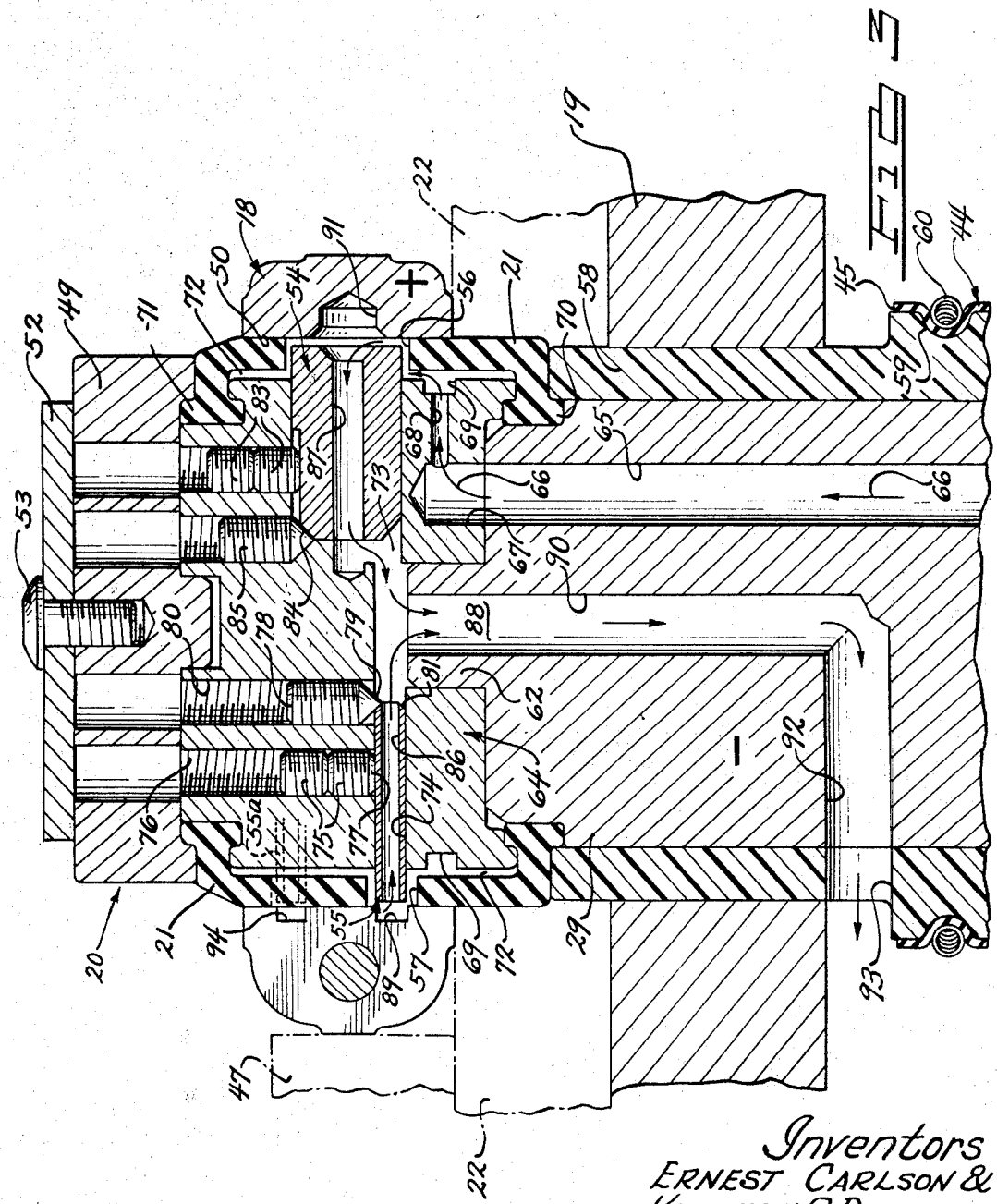

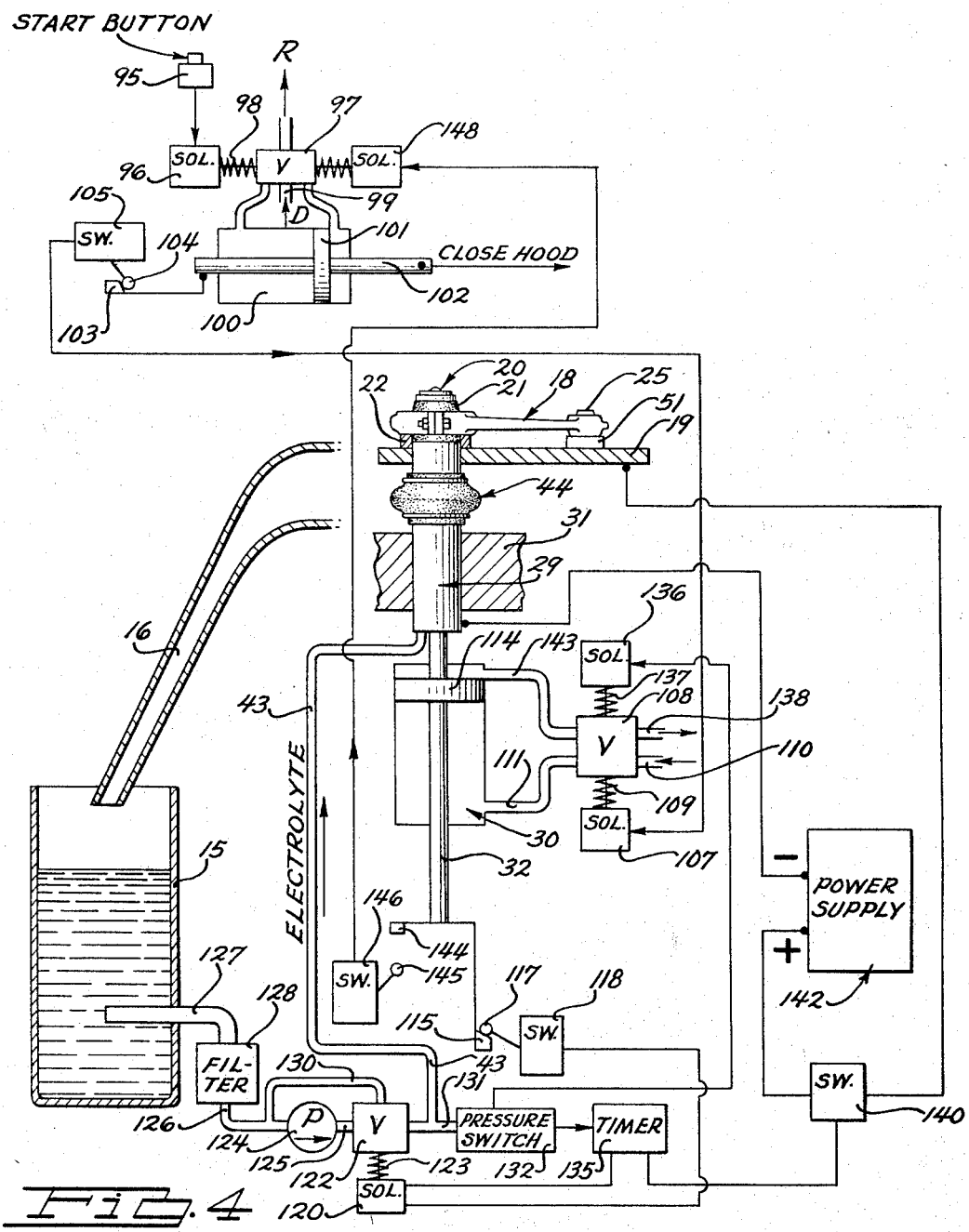

By Bower & Patalidis
Attorneys

United States Patent Office 3,410,781
Patented Nov. 12, 1968

3,410,781
ELECTROCHEMICAL MACHINING APPARATUS
FOR INTERNAL SURFACE DEBURRING
Ernest Carlson, Birmingham, and Kenneth C. Dettmer, Detroit, Mich., assignor to Ex-Cell-O Corporation, Detroit, Mich.
Filed Nov. 27, 1964, Ser. No. 414,311
10 Claims. (Cl. 204—224)

ABSTRACT OF THE DISCLOSURE

An electrochematical apparatus having a stationary cathode tool means concentric with a stationary anode workpiece in which electrolyte flows through passages in said electrode to deburr portions of the surface of said workpiece.

---

This invention relates to electrochemical machining and, more particularly, to an improved method and apparatus for the electrochemical removal of small metal surface irregularities, commonly called deburring.

Electrochemical machining is well known in the art of metal working. For example, British Patent 335,003, issued Sept. 18, 1930, discloses a method and apparatus for making holes or cavities in metal by passing an electric current through an electrolyte from an electrode to a workpiece, and in which the electrode is held at a negative potential and the workpiece is at a positive potential. Because this type of apparatus employs a relatively high current density, for example, current densities of the order of 2,000 amperes per square inch, it is important that the spacing between the electrode and the workpiece be maintained accurately. Further, it is important that the electrolyte flow at a relatively rapid rate in order to prevent a build-up of conducting material between the electrode and workpiece and to remove the heat generated. For example, the electrolyte may be a salt solution and may flow at a velocity of the order of 1,800 feet per minute. To achieve this velocity, it is necessary to maintain the electrolyte under a substantially high pressure; for example, pressures of the order of 50 to 200 pounds per square inch are often employed. When an electrolyte under pressures of this order of magnitude is directed through nozzles, or through passages through an electrode, onto a workpiece, a varying form is produced upon the workpiece. This force tends to move the workpiece relative to the electrode. Such movement is undesirable because it changes the resistance between the electrode and the workpiece and thus modifies the current density.

Relative movement between the electrode and the workpiece cannot be tolerated because, for high current densities, the spacing between the workpiece and the electrode is of the order of thousandths of inches. The problem of dealing with electrolyte pressure and relative movement between a workpiece and an electrode is disclosed in United States Patents No. 3,058,895, issued to Lynn A. Williams on Oct. 16, 1962, and No. 3,095,364, issued to John A. Gurklis on June 25, 1963. In these patents electrochemical machining is employed to form holes or cavities, or to shape a workpiece, and the electrode is progressively moved into a hole or cavity, or toward the workpiece while maintaining a balance between the pressure upon the electrode and the pressure of the electrolyte. It is known that electrochemical machining requires a high energy level per unit of material removed and it is, therefore, extremely important when employing the electrochemical method to remove burrs or other small irregularities from a workpiece, that the current density and the spacing between the electrode and the workpiece be maintained accurately at a constant value.

Accordingly, it is an object of this invention to provide an apparatus employing an electrochemical process for removing relatively small particles from a metal work piece.

Another object of this invention is to provide an electrochemical method for removing burrs from a metal work piece.

It is still another object of this invention to provide an electrochemical apparatus for removing small particles from a metal workpiece, which apparatus provides for balancing the fluid pressure of an electrolyte against the workpiece at spaced points along the surface of the work piece, such that the electrolyte pressure does not cause relative movement between the workpiece and the electrode.

It is yet another object of this invention to provide an electrochemical apparatus in which only a portion of a workpiece is subjected to electrolyte pressure, and in which the electrolyte pressure is employed to actuate a fluid seal to prevent the loss of electrolyte between the apparatus and the workpiece.

A still further object of this invention is to provide an electrochemical apparatus which is completely automatic.

Still another object of this invention is to provide an electrochemical machining method and apparatus in which a metal workpiece may be machined quickly and accurately to a high degree of precision.

Briefly, in accordance with aspects of a preferred embodiment of this invention, a novel apparatus is provided for electrochemechanical machining a metal workpiece to a high degree of precision, which apparatus includes means for supporting a metal workpiece upon at least one electrode of the apparatus and, preferably, for supporting the workpiece in a position to engage an electrode head having several electrodes with electrolyte passages there through. Advantageously, a fluid sealing boot is disposed between the electrode head and the workpiece, and fluid passage means for the pressurizied electrolyte is provided to direct the electrolyte against the inner surface of the fluid sealing boot such that the electrolyte aids the production of a fluid seal between the boot and the workpiece. Also advantageously, the pressurized electrolyte is directed around the entire inner surface of the fluid sealing member, or boot, such that the pressure upon the boot and the resulting pressure upon the workpiece is uniform in all directions, and therefore, the pressure of the electrolyte does not tend to change the position of the workpiece relative to the electrodes. Still further, because the electrolyte is introduced against the inner surface of the fluid sealing boot through passages remote from the electrodes and the electrolyte is returned to an electrolyte reservoir through the passages in the electrodes, there are no localized areas on the workpiece of relatively high electrolyte pressure which might tend to change the relative position of the workpiece and electrodes.

In accordance with other aspects of this invention, an apparatus is provided for supporting a metal workpiece in rigid, fixed relationship relative to one or more electrodes and for supplying pressurized electrolyte between the electrode and the workpiece after first applying the pressure of the electrolyte to large distributed areas on the workpiece and removing the electrolyte through passages through the electrodes such that the forces of the electrolyte upon the workpiece are dynamically balanced.

In accordance with yet other aspects of this invention an electrochemical machining apparatus is provided which has a combination of hydraulic and electrical controls for controlling the complete machining cycle so as to provide a cycle which is relatively rapid and uniform, and which apparatus can be operated by unskilled operators.

In accordance with another embodiment of this invention, an electrochemical machining apparatus is provided which exhibits certain advantages in comparison to the first mentioned apparatus. For example, the latter embodiment is cheaper and simpler in construction. Advantageously, this alternative embodiment employs a cylindrical boot, or sleeve, which is wound around the electrode to provide a spacing and insulating device between the electrode and the workpiece. This cylindrical sleeve may be formed of any suitable material such as "Teflon," or "Teflon" coated glass fabric. This alternative electrode head is also characterized by inlet and exhaust ports for the electrolyte such that the electrolyte is introduced in the area between the electrode and the workpiece and is exhausted from between the electrode and the workpiece through an exhaust port in the electrode head. The electrolyte subsequently flows over the top of the electrode head and down over the workpiece.

Other objects, features and advantages of this invention will be apparent from the following detailed description, appended claims, and the accompanying drawings.

In the drawings:

FIGURE 1 is a side elevation view, partly broken away, of a portion of a preferred embodiment of an electrochemical apparatus made in accordance with the principles of this invention;

FIGURE 2 is an enlarged plan view of a portion of the structure illustrated in FIGURE 1, showing a connecting rod workpiece held in a position to be machined;

FIGURE 3 is an elevational sectional view of the structure illustrated in FIGURE 2, taken along the lines 3—3 thereof, and looking in the direction of the arrows;

FIGURE 4 is a combined block, schematic and pictorial diagram of a control system which may be employed with the apparatus of the present invention;

FIGURE 5 is a view in elevation of an electrode head according to an alternative embodiment of this invention;

Figure 6:
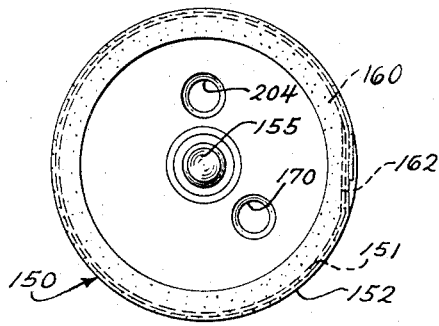
FIGURE 6 is a bottom plan view of the electrode head of FIGURE 5, taken along the line 6—6 thereof, and looking in the direction of the arrows.

Referring now to the drawings, FIGURE 1 is a view in elevation, partly broken away, of an illustrative and preferred embodiment of an electrochemical machining apparatus according to this invention, and generally indicated by the numeral 10. The apparatus 10 includes a frame 11 on which is mounted a suitable workpiece encircling housing 12, the top of which is enclosed by a cover 13 which is pivotally mounted on the housing 12 by means of a hinge pin 14. The frame 11, supports an electrolyte reservoir 15 which contains a suitable conducting electrolyte, and this electrolyte is pumped into a cavity between a workpiece 18 and the electrodes, not shown, and returns to the reservoir 15 through a suitable conduit 16.

The workpiece 18 which, in this particular instance, is a connecting rod of the type employed in internal combustion engines, is to be electrochemically machined to remove burrs from the bearing anchor slots and oil hole. As shown in FIGURE 1, the workpiece 18 is supported within the workpiece housing 12 on a platform 19 which is covered by the cover 13. A plurality of electrodes, not shown, are supported within a cylindrical electrode head, generally indicated by the numeral 20, which is reciprocally mounted for axial movement so that it may be moved into a position within the crankshaft passage in workpiece 18 for a machining operation, and removed from the crankshaft passage of workpiece 18 after the machining is completed, in a manner which will be described subsequently.

The electrode head 20 includes a generally cylindrical fluid sealing boot 21 which has electrode-electrolyte apertures and is secured at its edges to prevent the escape of the electrolyte from between the electrodes and the workpiece in a manner which will be described in detail hereinafter. The workpiece 18 is supported on a rest 22 and a pin 25 on platform 19, which pin 25 is tapered and enters the wrist pin hole 26 (FIGURE 2) in the workpiece or connecting rod 18. As shown in FIGURE 1, a rubber pressure pad 23 is mounted in a suitable holder 24 secured beneath the cover 13 in a position to engage the workpiece 18 when the cover 13 is closed. The platform 19 is connected to the positive terminal of a suitable power supply (see FIGURE 4) by means of a cable 27 which is connected to a terminal 28 on the platform 19.

As shown in FIGURE 1, the electrode head 20 is mounted on the upper end of a vertically disposed, elongated cylindrical member 29 which is reciprocally mounted in the frame member 31. The cylindrical member 29 is connected to and supported by the platform 33 which is connected by a piston rod 32 to a piston within the hydraulic cylinder 30. Also mounted on the platform 33 is a guide rod 35 for controlling the alignment of the cylindrical member 29 relative to its passage through the frame member 31. The guide rod 35 is slidably mounted through a suitable bushing 36 supported in the frame 11, which bushing may, for example, be made of nylon or other suitable bearing material. The platform 33 carries a stop block 36 preferably made from a resilient material, such as rubber, for limiting the upward movement of the platform 33 and therefore limiting the upward travel of the electrode head 20. As shown in FIGURE 1, electrical current for the electrode head 20 is supplied through the platform 33 and the cylindrical member 29 from a power supply, shown in FIGURE 4, which is connected to a bus bar 38. Bus bar 38 is connected to the platform 33 by means of a flexible cable 39 which is connected between a terminal 40 on bus bar 38 and a terminal 41 on platform 33.

As seen in FIGURE 1, the electrolyte for the process is pumped from the reservoir 15 to the cylindrical member or ram 29 through a flexible hose 43. After the electrolyte has passed between the electrodes in the electrode head 20 and the workpiece 18, it is returned through the electrodes and cylindrical member 29 and discharged beneath the support platform 19 into the workpiece housing 12 and passes through the discharge conduit 16 into the reservoir 15. Because the electrolyte is discharged from a port in the cylindrical member 29, not shown in FIGURE 1, it is necessary to prevent the electrolyte from leaking between the surface of the cylindrical member 29 and the inner edge of the housing 12. This is accomplished by encircling the cylindrical member 29 in a flexible waterproof seal 44 made from a suitable material, such as rubber, and secured in fluid sealing relationship at its upper edge 45 to the periphery of the cylindrical member 29 in a manner which will be subsequently described. The flexible seal 44 permits the cylindrical member 29 to reciprocate longitudinally while preventing the electrolyte from leaking from the housing 12.

Referring now to FIGURE 2, there is depicted a plan view, to an enlarged scale relative to FIGURE 1, of the connecting rod workpiece 18 and its supporting platform 19, and including the electrode head 20. The workpiece 18 is supported on the electrode head 20 by means of a pair of diametrically positioned blocks 47 and 48, which blocks are preferably reversibly mounted on the platform 19 so that they may be rotated relative to platform 19 to accommodate different sized workpieces. The reversible blocks 47 and 48 are preferably made of metal, such as hardened steel, so that they conduct electricity to the workpiece 18 from the platform 19. Also preferably, the platform 19 is formed of a suitably chemically resistant metal such as stainless steel.

As seen in FIGURES 2 and 3, the electrode head 20 is substantially circular and closely conforms to the inner surface or inside diameter of the crankshaft passage 50 in the workpiece 18. The electrode head 20 includes a circular hood or cover 49 which is preferably formed of stainless steel or some other chemically resistant metal. The outer diameter of the cover 49 is approximately ten-thousandths of an inch smaller than the inside diameter of the crankshaft passage 50 in the workpiece 18. As previously mentioned, the locating or alignment pin 25 tapers upwardly so that the workpiece 18 can be thrust manually downward onto the pin 25 to maintain a snug fitting engagement through which electrical current is also supplied. Beneath the alignment pin 25 is a rest, or support member 51 which limtis the downward movement of the workpiece 18. A suitable cap 52 is provided on cover 49 and held in position by a screw 53. FIGURE 2 includes a pair of hollow electrodes, shown in dotted lines and designated by the numerals 54 and 55, which are employed in the electrochemical process in a manner well known in the art.

FIGURE 3 is a view in section, taken along the lines 3—3 of FIGURE 2, to an enlarged scale. The boot 21 has a pair of radial or transverse apertures 56 and 57 to receive the electrodes 54 and 55, respectively, and these apertures are larger than the electrodes to permit electrolyte to flow between the electrodes 54 and 55 and the workpiece 18. The upper end of the cylindrical member 29 is encircled by an insulating sleeve 58 which is formed of any suitable insulating material such as nylon. The upper edge 45 of the flexible seal 44 is secured in fluid sealing engagement in a suitable notch 59 of the sleeve 58 by means of a helical spring 60. The upper end of the cylindrical member 29 terminates in a reduced cylindrical portion 62 on which is mounted a cylindrical body or member 64, which constitutes electrode supporting means.

The cylindrical member 29 has a longitudinally extending fluid passage 65 through which electrolyte flows toward the workpiece 18, as indicated by the arrows 66. The arrows 66 indicate that, as viewed in FIGURE 3, the electrolyte flows upwardly through the passage 65 until it reaches the cylindrical member 64. The cylindrical member 64 includes a fluid passage 67 which communicates with the passage 65 and a transverse or radial passage 68 which communicates with the longitudinal passage 67 and the outer periphery of the member 64. Advantageously, the transverse passage 68 communicates with an annular fluid passage 69 which is formed around the periphery of the member 64 and adjacent the inner surface of the boot 21. The inner peripheries or edges 70 and 71 of the boot 21 are generally T-shaped in cross section with the crossbar of the T secured in suitable notches between the sleeve 58 and the members 29 and 64, and between the hood 49 and the member 64, respectively. The electrolyte, in passing through the passage 65, 67 and 68 and into the annular passage 69, which communicates with an annular passage 72 between the member 64 and the entire area of the inner surface of the flexible portion of boot 21, applies a uniform outward pressure on the inner surface of the boot 21 and thus forces the boot 21 into fluid sealing engagement with the workpiece 18.

As shown in FIGURE 3, the cylindrical member 64 includes a pair of radially directed passages 73 and 74 which receive the radially disposed electrodes 54 and 55, respectively. The electrode 55 is secured in a desired position in the passage 74 by a pair of abutting locking screws 75 which are threadably mounted in a longitudinal bore 76 in the body 64. The lower screw 75 terminates in a substantially flat surface 77 which snugly engages a small area of the outer surface of the electrode 55 and exerts a clamping pressure on the electrode 55. An adjusting screw 78 having a conical lower end surface 79 is threadably mounted in a longitudinal bore 80 in the body 64, and the conical surface 79 engages the tapered edge 81 on the inner end of the electrode 55. With this combination of locking screws 75 and adjusting screw 78, it is possible to quickly and accurately secure the electrode 55 in an adjusted position in the passage 74. In order to achieve this arrangement, the locking screws 75 are disengaged from the electrode 55 and the adjusting screw 78 is rotated to move the electrode 55 radially outward relative to the cylindrical member or body 64. When the desired adjusted position is reached, the locking screws 75 are again rotated until the end surface 77 securely engages the electrode 55. Similarly, the electrode 54 is secured in position in the passage 73 by a plurality of pairs of locking screws 83. The inner end of the electrode 54 is tapered at the outer edge 84 which is engaged by a pair of conical surfaced adjusting screws 85. The electrode 54 may be adjusted radially outward by releasing the locking screws 83 and threading the adjusting screws 85 downwardly in a manner just described with respect to electrode 55 and locking screws 75 and adjusting screws 78. The electrodes 54 and 55 are adjusted outwardly to position the outer ends of the electrodes in close proximity to the slot 89 and hole 91, the edges of which are to be deburred. The gap between the electrodes and the workpiece inner diameter 50 is determined by the desired metal removal rate in accordance with Faraday's law of electrolysis, as is well known in the art.

As shown in FIGURE 3, electrodes 54 and 55 are provided with axial fluid passages 86 and 87, respectively, to permit the electrolyte to enter the electrode head 20 from the space between the electrodes 54 and 55 and the workpiece 18. The electrolyte then passes through a diametrical passage 88 into a longitudinal passage 90 formed in the cylindrical member 29, from which passage 90 the electrolyte enters a radial, outwardly directed passage 92 which communicates with the passage 90, and the electrolyte then passes through a suitable aperture 93 in the insulating sleeve 58. After the electrolyte exhausts from the aperture 93, it passes downwardly over the flexible boot 44 and outwardly through the discharge conduit 16 (FIG. 1) into the reservoir 15. The entire machining operation is automatically controlled and a suitable control system is disclosed in detail in FIGURE 4. As shown in FIGURE 3, the slot 94 in the workpiece is also deburred by an electrode generally indicated by the numeral 55a and which is connected by suitable passages to passage 88 for passage of electrolyte therethrough. Electrode 55a functions in the same manner as electrode 55.

For an explanation of the operation of the control system of FIGURE 4, it is assumed that the operator has placed a workpiece 18 upon the alignment pin 25 and between the reversible blocks 47 and 48 and has pushed a start button 95. It is also assumed that the electrodes 54 and 55 have adjusted to the desired positions. The actuation of the start button 95 causes the energization of a solenoid 96, which solenoid 96 is connected to a pressure fluid flow control valve 97 by means of a suitable mechanical link 98. The energization of solenoid 96 causes pressurized fluid to enter the valve 97 from a suitable pressurized source indicated by an inlet conduit 99. The pressurized fluid enters a fluid cylinder 100 on the left hand side of a suitable piston 101, which is provided with an integral rod 102, and causes the piston 101 and rod 102 to move to the right, as viewed in FIGURE 4. The movement of piston rod 102 closes the hood 13 by a suitable interconnecting mechanism, not shown. The movement of piston 101 continues until a bumper 103 mounted on the end of piston rod 102 engages a switch arm 104 of a switch 105 and actuates the switch. When bumper 103 engages arm 104 and actuates switch 105, a solenoid 107 is energized, opening a valve 108 through a suitable mechanical linkage 109 to permit pressurized fluid to enter an inlet conduit 110 and a conduit 111 and then pass into the lower portion of fluid cylinder 30 to move a piston 114 in the cylinder 30 upwardly. This movement continues until a bumper 115 mounted on the lower end of the piston rod 32 engages a switch arm 117. When bumper 115 engages switch arm 117, a switch 118 is actuated. When piston 114 is forced upwardly, its piston rod 32 moves the cylindrical member or ram 29 upwardly to the machining position shown in FIGURE 4, which position is the upper limit of travel of piston 114, as limited by the stop block 36 engaging the lower side of frame 11, as shown in FIGURE 1. The electrode head 20 is thus positioned within the crank shaft passage 50 of the workpiece 18.

The actuation of switch 118 energizes a solenoid 120. When solenoid 120 is energized, it actuates a value 122 through a suitable mechanical linkage 123. The valve 122 is connected to the output side of the pump 124 by a conduit 125. The intake side of the pump 124 is connected to the electrolyte reservoir 15 by means of a pair of conduits 126 and 127, and an intermediate electrolyte filter 128. The valve 122 is connected to a by-pass or return flow conduit 130 for returning the electrolyte to the intake side of the pump 124 by way of conduit 126. The valve 122 is also connected through a conduit 131 to a pressure switch 132 and the hose 43 which supplies electrolyte between the electrodes and the workpiece 18 by way of the cylindrical body 29. The pressure switch 132 is also operatively connected to a timer 135 and to a solenoid 136 which, through a suitable linkage 137, controls the exhaust of the pressurized fluid through the valve 108 by way of a discharge conduit 138. The timer 135 is connected to the solenoid 120 to control the release of the solenoid 120 and is also connected to a switch 140, which switch is connected between a suitable power supply 142, and the platform 19 which supports the workpiece 18, to control the electrical machining current to the workpiece 18.

Thus, after the hood 13 is closed by the piston rod 102 and the switch 105 is energized, the solenoid 107 is energized controlling the inlet of pressurized fluid below the piston 114. After the piston 114 has reached its uppermost position, bumper 115 engages arm 117 and actuates the switch 118 energizing the solenoid 120. Energization of solenoid 120 controls the valve 122 to admit the electrolyte from the electrolyte pump 124 into the conduit 131. After the electrolyte in the conduit 131 reaches a suitable pressure, it actuates pressure switch 132 which starts the timer 135 and the timer 135 actuates the switch 140 to apply electrical current through the workpiece supporting table 19 to the workpiece 18. During this time, electrolyte is being pumped from pump 124 through the hose 43 and the cylindrical member 29 to the region or space between the electrodes 54 and 55, and the electrolyte is maintaining a fluid seal between the boot 21 and the workpiece 18.

After a predetermined time, which, in this instance, is a matter of a few seconds, the timer 135 de-energizes the switch 140 and the solenoid 120 thus turning off the electrical current to the workpiece 18 and returning the valve 122 to a position in which it returns electrolyte from the pump 124 through the conduit 130. The closing of the valve 122 eliminates the pressure in the conduit 131 and therefore the switch 132 is de-energized thus causing the actuation of the solenoid 136 which, in turn, actuates the valve 108 through a suitable linkage 137. This action causes the valve 108 to be controlled in a manner in which intake pressurized fluid from the conduit 110 is fed through a conduit 143 communicating with the top portion of the cylinder 30, which fluid causes the piston 114 to move downwardly. The piston 114 continues to move downwardly until a bumper 144 mounted on the lower end of this piston rod 32 engages an arm 145 of a switch 146. When bumper 144 pushes arm 145, switch 146 is actuated which, in turn, energizes a solenoid 148 which is suitably coupled to valve 97 to cause the admission of pressurized fluid through the control valve 97 into the right hand end of cylinder 100. This fluid causes the piston 101 to move to the left, as viewed in FIGURE 4, and the piston rod 102 opens the hood 13.

The machining cycle has now been completed and the system is ready to repeat the cycle as soon the operator removes the finished or deburred workpiece 18, replaces it with a new unfinished workpiece 18, and operates the start button 95. In one illustrative embodiment of this invention, this machining cycle required a period of the order of 30 seconds, including the time required to load and replace the workpiece 18. Although only one platform 19 is shown for a single workpiece 18, it will be understood that the apparatus may include banks of supporting platforms 19 and the associated apparatus for automatically machining a large number of parts or workpieces simultaneously.

In deburring the workpiece 18, it will be understood that the burrs on the edges of the slots 89 and 94 and on the edges of the hole 91 are closer to the adjacent electrodes than the finished surface of the diameter 50 and the worrkpiece 18. Therefore, the current density will be greater at the burrs on the workpiece 18 than the other portions of the electrode and, because the electrolyte is a saline electrolyte, and the resistance is lower in the electrolyte near the area of the burrs because of the decreased distance between the burrs and the electrodes, the current will flow through these points to remove the burrs.

Referring now to FIGURES 5 through 8, there is shown an alternative embodiment of an electrode head according to this invention and generally indicated by the numeral 150. As therein depicted, electrode head 150 is a substantially cylindrical member having a reduced cylindrical recess 151 on the periphery thereof, around which recess is wound a boot, or cylindrical sleeve, 152. The cylindrical sleeve 152 is made from a suitable insulating material and preferably a relatively thin "Teflon" coated fabric, for example, a material with a thickness of the order of ten-thousandths of an inch. This material has been wrapped around the electrode head 150 in the cylindrical recess 151 until the diameter of the cylindrical sleeve 152 is slightly greater than the diameter of the cylindrical cap 153 such that, while the cap 153 will freely pass through an aperture in a workpiece, the sleeve 152 frictionally engages the cylindrical surface of the aperture in the workpiece, such as the workpiece 161 shown in FIGURE 8. This sleeve 152 may be formed by wrapping the "Teflon" coated glass fabric around the cylindrical electrode head 150 until the required thickness is obtained and then cementing between each layer of "Teflon" so that the sleeve 152 is held firmly in place.

Figure 8:
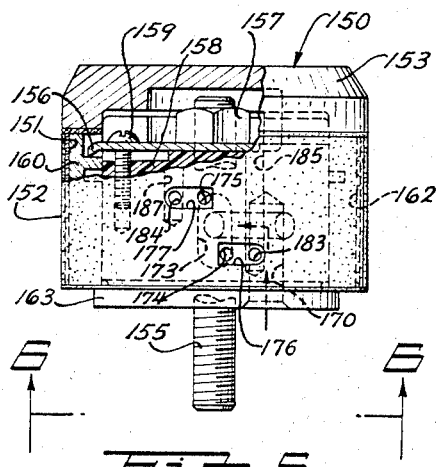
FIGURE 8 is an elevational sectional view of the structure illustrated in FIGURE 7, taken along the line 8—8 thereof, and looking in the direction of the arrows.
Figure 9:
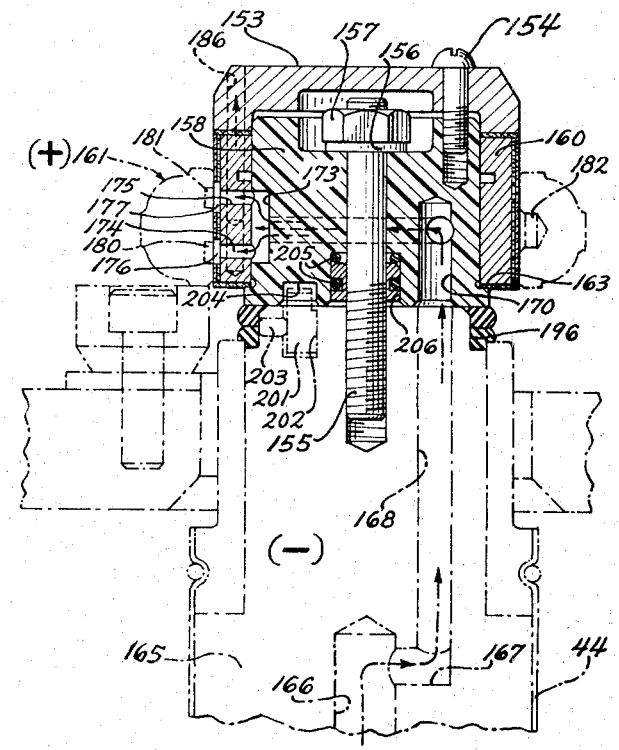

As shown in FIGURE 8, the cap 153 is held in place in a body or member 158 by a plurality of suitable screws 154. The electrode head 150 has a threaded screw 155 extending downwardly therefrom and a conducting strap 156 encircling screw 155 on the upper end thereof. The strap 156 is retained on the screw 155 by the nut 157. As shown in FIGURE 5, the outer end of strap 156 is secured to the electrode 160 by screw 159 which is threaded into member 158. The central portion of the electrode head 150 is a cylindrical member 158 which is preferably formed of a suitable plastic, such as "Delrin." Electrode or annular tubular sleeve 160 encircles the plastic cylinder 158 and is a suitable metallic sleeve formed of a material which is easily machined, such as bronze.

As shown in FIGURE 6, electrode or annular tubular sleeve 160 is provided with a flattened portion 162 where the end of the glass coated fabric is glued to the remainder of the fabric such that the additional layer of fabric does not introduce additional friction between the workpiece and the electrode 160. The cylindrical plastic body or member 158 is provided with fluid conduits which permit the entry and exhaust of electrolyte relative to the workpiece 161, shown only in FIGURE 8. The central cylinder 158 includes an outwardly extending circular flange or shoulder 163 for supporting the annular tubular sleeve or electrode 160.

Figure 7:
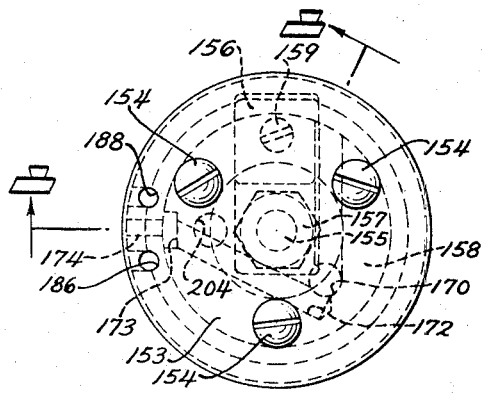
FIGURE 7 is a top plan view of the electrode head of FIGURE 5.

FIGURE 8 is a view in elevation and in section, taken along the lines 8—8 of FIGURE 7, and includes a cylindrical electrode head supporting member, generally indicated by the numeral 165. The support member 165 is provided with an inlet conduit 166 which communicates with a radially extending fluid passage 167 which, in turn, communicates with a vertically extending electrolyte passage 168. The passage 168 in the cylindrical electrode supporting member 165 communicates with an axially aligned passage 170 in the cylindrical plastic member 158.

As shown in dotted outline in FIGURE 7, the passage 170 communicates with a substantially horizontal passage 172 in the cylindrical plastic member 158, which passage 172 terminates in an elliptical recess 173 in the surface of the cylindrical member 158. The recess 173 is substantially elliptical in elevation as shown in dotted outline in FIGURE 5. As shown in FIGURES 5 and 8, this recess 173 communicates with a pair of passages 174 and 175 through the annular tubular sleeve or electrode 160. The passages 174 and 175 through the annular electrode 160 register with apertures 176 and 177, respectively, in sleeve 152; the passage 174 communicates with a recess 180 in the workpiece 161 while the passage 175 communicates with a recess 181 in the workpiece 161. In this particular example, the workpiece 161 is an engine connecting rod and the recesses 180 and 181 are those normally employed for anchor slots. The edge of oil squirt hole 182 is also deburred by means of an arrangement similar to the arrangement provided for deburring recesses 180 and 181. It is understood, of course, that the basic concept of deburring and this apparatus can be employed on any workpiece in which it is desired to deburr a portion which has an internal circular surface. In this alternative embodiment, because the electrode is an annular tubular sleeve 160, the adjustable electrodes and the adjusting and locking screws of the first described embodiment have been eliminated.

As shown in FIGURE 5, a pair of fluid passages 183 and 184 in the annular tubular electrode 160 communicate with the recesses 180 and 181 of the workpiece 161. The passage 183 extends radially into the annular tubular electrodes 160 and communicates with a vertically extending passage 185 which, in turn, communicates with a suitable exhaust passage 186 (FIGS. 7 and 8) in the cap 153. This exhaust passage 186 is vented through the upper surface of the cap 153 to permit the electrolyte to be exhausted over the outer surface of the cap 153 and down over the workpiece 161 and through suitable collecting funnels and drains to a suitable reservoir, such as shown and described in conjunction with FIGURE 4. The passage 184 (FIG. 5) communicates with a suitable vertical passage 187 in the annular electrode 160. Passage 187 communicates with a suitable passage 188 extending vertically through the cap 153. This passage 188 is shown only in FIGURE 7.

The electrolyte, in being fed to the region or space between the electrode 160 and the workpiece 161, is fed through the conduits 166, 167, 168, 170, 172, 173, 174 and 175 to the workpiece 161 and is exhausted through the two parallel conduits or passages 183, 185, 186 and 184, 187, 188. The cap 153 is retained on the cylindrical dielectric member 158 by means of downwardly extending screws 154 which threadably engage the cylindrical member 158, as shown in FIGURES 5 and 8. The electrode assembly 150 and its support member 165 are provided with suitable seals to prevent the electrolyte from entering regions where it might cause undesirable chemical action and possibly short circuit the electrical path. For example, immediately beneath the outwardly extending annular shoulder 163 is a pair of suitable O-rings 194 and 195 which rest upon a cylindrical recess 196 of the electrode support 165 and define a fluid seal between the plastic cylindrical member 158 and a plastic sleeve 197 around the electrode support 165. It will be understood, that other electrolyte passages may be provided through the electrode head 150 in accordance with the location of the burrs on the workpiece.

As shown in FIGURE 8, the electrode head 150 is adapted to be located relative to the electrode supporting member 165 by means of the locating pin 201. The locating pin 201 is mounted in the longitudinally extending hole 202 formed on the upper end of the support member 165. A suitable lock screw 203 secures the pin 201 in the hole 202. The pin 201 extends upwardly into the locating hole 204 formed in the lower side of the central cylindrical body 158. A suitable O-ring sealing means 205 is operatively mounted around the screw 155 and is disposed in a suitable recess 206 formed on the lower side of the body 158.

Although the electrical circuit is not shown, suitable electrical connections are provided to connect the electrode support 165 to the negative terminal of a power supply and to connect the workpiece 161 to the positive terminal of a power supply in the same manner as the first described embodiment. It will be understood that the electrode support 165 is constructed and adapted to function in the manner as the aforedescribed cylindrical member or ram 29 and the first embodiment for moving the electrode head 150 upwardly and downwardly between operative and inoperative positions.

In deburring the workpiece 161, it will be understood that the burrs on the workpiece are closer to the electrode 160 than the finished part of the workpiece and therefore the current density will be greater at the burrs on the workpiece than the other portions of the electrode 160 and, because the electrolyte is a saline electrolyte and the resistance is lower in the electrolyte near the area of the burrs because of the decreased distance between burrs and electrode 160, the current will flow through these points to remove the burrs in an electrochemical action.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. An apparatus for electrochemically deburring an electrically conductive workpiece comprising:
 (a) an electrode supporting means;
 (b) a cylindrical member mounted on said electrode supporting means;
 (c) an annular electrode encircling and in contact with said cylindrical member;
 (d) means for supporting a workpiece concentric with the periphery of said annular electrode;
 (e) an insulating sleeve encircling said annular electrode and having electrolyte passages formed radially therethrough;
 (f) fluid passage means extending longitudinally through said electrode supporting means and said cylindrical member, and including at least one fluid passage extending radially through said cylindrical member connecting with said radially extending passages of said insulating sleeve; and,
 (g) means for supplying electrical current relative to said electrode and said workpiece supporting means.

2. An apparatus for electrochemically deburring the internal surface of a circular aperture in an electrically conductive workpiece comprising:
 (a) a movably mounted electrode supporting means;
 (b) a dielectric cylindrical member mounted on said electrode supporting means;
 (c) fluid passages formed through said electrode supporting means and said cylindrical member, including at least one passage extending radially through said cylindrical member;
 (d) an annular electrode mounted on the periphery of said cylindrical member and having fluid passages formed therethrough and communicating with the fluid passages in said electrode supporting means and cylindrical member;
 (e) means for supporting a workpiece having a circular aperture concentric with said electrode supporting means;
 (f) an insulating sleeve encircling said annular electrode and having fluid passages formed radially therethrough and communicating with said fluid passages in said annular electrode;
 (g) means for moving said electrode supporting means into and out of machining engagement with said internal surface of said workpiece;

(h) means for supplying electrolyte through said fluid passages and between said electrode and internal surface of said workpiece; and, (i) means for supplying electrical current relative to said electrode and said workpiece supporting means when the electrode is in machining engagement with the internal surface of the workpiece.

3. The electrochemical machining apparatus as defined in claim 2, wherein:

(a) said workpiece supporting means includes a cover for enclosing said workpiece; and, (b) cover operating means for moving said cover into a position enclosing said workpiece and for opening said cover.

4. The electrochemical machining apparatus as defined in claim 3 including:

(a) timing means for terminating the supply of electrolyte, terminating the supply of electrical current and actuating said cover operating means after a predetermined time.

5. In an electrochemical machining apparatus for machining an electrically conductive workpiece by electrolytic action, the combination comprising:

(a) a workpiece support means;

(b) electrode head means insulatedly mounted through said support means;

(c) a generally cylindrical resilient boot encircling said electrode head means, said boot having aperture means thereon;

(d) means for supplying pressurized electrolyte to the interior of said boot between said electrode head means and through said aperture means of said boot; and (e) means for energizing said electrode head, whereby portions of the interior bore surface of a stationary workpiece adjacent said aperture means of said boot is deburred electrolytically.

6. The combination as defined in claim 5 further including:

(a) means for periodically reciprocating said electrode head means into a position within the inner surface of a workpiece.

7. The electrochemical machining apparatus as defined in claim 5 including:

(a) timing means for terminating the supply of electrolyte and for terminating the supply of electrical current after a predetermined time.

8. In an electrochemical machining apparatus, as defined in claim 5, wherein said electrode head comprises:

(a) a first cylindrical member having a plurality of longitudinally extending passages for electrolytic flow therein;

(b) a second cylindrical member mounted on and secured to said first cylindrical member, said second cylindrical member having a plurality of radially extending passages; and, (c) electrode means in said second cylindrical member extending into said aperture means of said resilient boot, but not beyond the outer diameter of said resilient boot, said electrode means having a bore extending therethrough, whereby the pressurized flow of electrolyte is adapted to flow through at least one of said plurality of longitudinally extending passages to the interior of said boot between said second cylindrical member and the interior of said resilient boot through said aperture means adjacent said electrode means to electrolytically deburr the interior surface of a workpiece and return through the other of said longitudinally extending passages.

9. An electrochemical machining apparatus for machining an electrically conductive workpiece comprising:

(a) means for supporting said workpiece;

(b) electrode head means for engaging a portion of the surface of said workpiece in fluid sealing relationship and including an electrode supported in closed proximity with the surface of said electrode head means;

(c) control means automatically reciprocating said electrode head means into and out of machining engagement with said workpiece at predetermined intervals;

(d) means for automatically supplying electrolyte to the surface of said workpiece adjacent said electrode;

(e) means for automatically supplying electrical current relative to said electrode and said workpiece;

(f) means for automatically terminating the flow of electrolyte and the flow of electrical current;

(g) said workpiece supporting means includes a cover for enclosing said workpiece; and, (h) wherein said control means includes means for moving said cover into a position enclosing said workpiece.

10. The electrochemical machining apparatus as defined in claim 9 wherein:

(a) said means for moving said cover into a position enclosing said workpiece includes means for opening said cover after said predetermined time.

References Cited

UNITED STATES PATENTS

| | | | |
|---|---|---|---|
| 3,255,097 | 6/1966 | Williams | 204—143 |
| 3,267,018 | 8/1966 | Greening | 204—143 |
| 3,268,434 | 8/1966 | Weingartner | 204—224 |
| 3,271,283 | 9/1966 | Clifford et al. | 204—224 |
| 3,287,245 | 11/1966 | Williams | 204—224 |

JOHN M. MACK, *Primary Examiner.*

DONALD R. VALENTINE, *Assistant Examiner.*